(12) United States Patent
Rives et al.

(10) Patent No.: US 8,707,170 B2
(45) Date of Patent: Apr. 22, 2014

(54) GESTURE BASED EDIT MODE

(75) Inventors: Christopher M. Rives, Houston, TX (US); Craig T. Brown, Cypress, TX (US); Dustin L. Hoffman, Cypress, TX (US); Peter M. On, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 48 days.

(21) Appl. No.: 13/139,748

(22) PCT Filed: Dec. 15, 2008

(86) PCT No.: PCT/US2008/086883
§ 371 (c)(1),
(2), (4) Date: Jun. 15, 2011

(87) PCT Pub. No.: WO2010/071630
PCT Pub. Date: Jun. 24, 2010

(65) Prior Publication Data
US 2011/0258537 A1 Oct. 20, 2011

(51) Int. Cl.
*G06F 17/00* (2006.01)
*G06F 3/048* (2013.01)

(52) U.S. Cl.
USPC .......... 715/255; 715/234; 715/863; 345/156; 345/173

(58) Field of Classification Search
USPC ......... 715/200, 201, 202, 203, 209, 226, 234, 715/255, 256, 259, 700, 724, 731, 760, 762, 715/770, 862, 863; 345/156, 173, 179, 533
See application file for complete search history.

(56) References Cited

U.S. PATENT DOCUMENTS

| 6,525,749 | B1 | 2/2003 | Moran et al. | |
|---|---|---|---|---|
| 7,030,861 | B1 | 4/2006 | Westerman et al. | |
| 7,705,830 | B2 * | 4/2010 | Westerman et al. | 345/173 |
| 8,188,985 | B2 * | 5/2012 | Hillis et al. | 345/173 |
| 2004/0114982 | A1 * | 6/2004 | Lip | 400/472 |
| 2006/0010400 | A1 * | 1/2006 | Dehlin et al. | 715/856 |
| 2006/0022956 | A1 * | 2/2006 | Lengeling et al. | 345/173 |
| 2006/0026521 | A1 * | 2/2006 | Hotelling et al. | 715/863 |

(Continued)

FOREIGN PATENT DOCUMENTS

| CN | 101263443 A | 9/2008 |
|---|---|---|
| EP | 1942401 A1 | 7/2008 |

(Continued)

OTHER PUBLICATIONS

International Searching Authority, International Search Report and Written Opinion, Appln No. PCT/US2008/086883, date of mailing Sep. 11, 2009, pp. 11.

(Continued)

*Primary Examiner* — Maikhanh Nguyen (57) ABSTRACT

A system and method for document editing. A system includes an operator input device, a processor, gesture recognition program, and an edit mode program. The operator input device that senses gestures and multiple simultaneous touch points. The processor is coupled to the operator input device. The processor executes the gesture recognition program, which recognizes inputs from the input device. The gesture recognition program recognizes a predetermined edit mode gesture and, based only on the gesture, causes the processor to execute the edit mode program. The edit mode program provides a plurality of document editing functions for modifying a currently displayed document.

14 Claims, 5 Drawing Sheets

(56) References Cited

U.S. PATENT DOCUMENTS

| | | | |
|---|---|---|---|
| 2006/0026535 A1* | 2/2006 | Hotelling et al. | 715/863 |
| 2006/0026536 A1* | 2/2006 | Hotelling et al. | 715/863 |
| 2006/0031786 A1* | 2/2006 | Hillis et al. | 715/863 |
| 2006/0125803 A1* | 6/2006 | Westerman et al. | 345/173 |
| 2006/0197753 A1* | 9/2006 | Hotelling | 345/173 |
| 2006/0238518 A1* | 10/2006 | Westerman et al. | 345/173 |
| 2006/0238519 A1* | 10/2006 | Westerman et al. | 345/173 |
| 2006/0238520 A1* | 10/2006 | Westerman et al. | 345/173 |
| 2006/0238522 A1* | 10/2006 | Westerman et al. | 345/173 |
| 2007/0177803 A1 | 8/2007 | Elias et al. | |
| 2007/0177804 A1* | 8/2007 | Elias et al. | 382/188 |
| 2007/0252821 A1* | 11/2007 | Hollemans et al. | 345/173 |
| 2007/0273649 A1* | 11/2007 | Matsui et al. | 345/162 |
| 2008/0036743 A1 | 2/2008 | Westerman et al. | |
| 2008/0211785 A1* | 9/2008 | Hotelling et al. | 345/173 |

FOREIGN PATENT DOCUMENTS

| | | | |
|---|---|---|---|
| EP | 2252929 A1 | 11/2010 | |
| WO | WO 2007/057770 A2 | 5/2007 | |
| WO | WO-2007057770 | 5/2007 | |

OTHER PUBLICATIONS

Intellectual Property Office, Examination Report Under Section 18(3) received in related GB Application No. 1109198.0, mailed on Apr. 30, 2013, 3 pg.

Intellectual Property Office, Examination Report Under Section 18(3) received in related GB Application No. 1109198.0, mailed on Aug. 8, 2013, 2 pg.

* cited by examiner

GESTURE BASED EDIT MODE

BACKGROUND

Over the years, user interface systems of various types have been developed to facilitate control of computers and other electronic devices. Simple switches and knobs suffice to provide operator input information to some electronic devices. Computer systems, on the other hand, have generally employed more flexible data and control input means. Keyboard entry prevails in the command line environment, and the flexibility of keyboard entry indicates that some form of keyboard entry, for example, hard or soft keyboard entry, is likely to continue for the foreseeable future.

Use of pointing devices increased with the rise of graphical user interfaces. The mouse, trackball, touchpad, joystick, etc. are commonly used to direct the movement of a cursor on the display screen of a graphical user interface.

Touch screen technologies allow the surface or near surface of a display to serve as a user interface device. The touch screen detects user input in the form of screen touches, or near screen touches when using some touch screen technologies. Touch screens are advantageous in that no dedicated input device, apart from the touch detection apparatus coupled to the display, is required. A variety of touch screen technologies are available, including resistive, capacitive, infra-red, surface acoustic wave, and video each with its advantages and disadvantages.

Touch screen systems enabling recognition of multiple touch points have become increasingly popular. These systems, allow the use of gestures (e.g., hand or finger motion) and/or chording (e.g., the simultaneous use of multiple finger or hand touch points) to extend and simplify the touch screen operations. However, like a large vocabulary of commands in a command line system, an extensive set of gestures may be difficult for a user to remember.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Document editing functions, such as cut, copy, paste, undo, text/object selection, etc. are available in a wide variety of applications on any number of different platforms. These editing functions are not restricted to editors or word processors, but rather can be found, for example, in web browsers, spreadsheets applications, document viewers, email clients, and a host of other applications. Generally, any application that processes text and/or graphics can include these editing functions.

Figure 1:
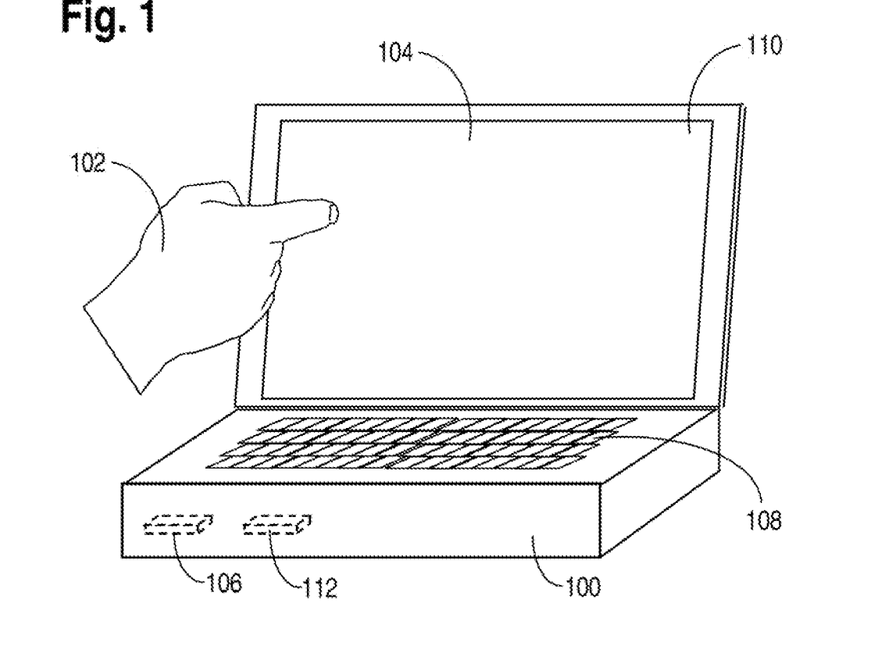
FIG. 1 shows a system that includes a gesture based edit mode applicable to a variety of applications in accordance with various embodiments.

Touch screen based systems employ on-screen finger taps and/or gestures to initiate operations. Embodiments of the present disclosure include a novel gesture-based edit mode to simplify to use of common document editing functions in a gesture-based system. FIG. 1 shows a system 100 that includes a gesture based edit mode applicable to a variety of applications in accordance with various embodiments. The system 100 includes a visual display 110, a touch and/or gesture input device 104, a processor 106, and data/program storage 112. Some embodiments of the system 100 can include other input devices, such as a keyboard 108, a mouse, etc. Embodiments can also include various input/output subsystems to implement, for example, wired and/or wireless networking. In FIG. 1, the system 100 is depicted as a notebook computer, however in practice the system 100 can be any of a variety of electronic devices. For example, the system 100 can be a touch screen or gesture-based telephone, personal digital assistant, music player, desktop computer, satellite navigation system, gaming system or other device that provides document editing.

The visual display 110 provides information to a user of the system 100, and can be, for example, a liquid crystal display ("LCD"), an organic light emitting diode ("OLED") display, or any other display technology useable with touch and/or gesture based input technology.

The touch and/or gesture based input device 104 provides operator inputs to the system 100 by detecting operator contact with the device 104, or gestures in the proximity of the device 104, and generating electrical signals representative of the detected contact and/or gestures. In FIG. 1, a user 102, is shown contacting a touch/gesture based input device 104 to provide input to the system 100. The input device 104 can be implemented in any of a variety of technologies, for example, a resistive, capacitive, surface acoustic wave, infrared, or optical system can overlay the visual display 110. In some embodiments, a video system can be used to detect user gestures. Embodiments of the system 100 encompass all input devices that detect user contact and/or gestures and convert detected contact and/or gestures to electrical signals.

The processor 106 can be a general purpose microprocessor, microcontroller, digital signal processor, etc. configured to execute software programs. The components of a processor are well known in that art and generally include execution units (e.g., integer, fixed point, floating point, etc.), instruction decoding, registers, memories, input/output ports, etc, interconnected by buses.

Data/program storage 112 is coupled to the processor 106. Data/program storage 112 can include various storage media, for example, magnetic storage (e.g., hard disks, floppy disks, tape, etc.), optical storage (e.g., compact disk, digital video disk, etc.), or semiconductor memory (e.g., static or dynamic random-access-memory ("SRAM" or "DRAM"), read-only-memory ("ROM"), FLASH memory, magnetic random access memory ("MRAM"), etc.).

The system 100 includes software programming stored in storage 112 that when executed by the processor 106 provides recognition of a gesture that initiates an edit mode useable in a wide variety of applications that include cut, paste, copy, undo, and/or selection operations. On recognition of the edit mode gesture, embodiments further recognize a gesture corresponding to each of the cut, paste, copy, undo, and/or selection operations, execute the selected operation, and exit the edit mode. Thus, embodiments advantageously provide a simple and consistent method of performing document-editing operations applicable to a wide variety of applications.

Figure 2:
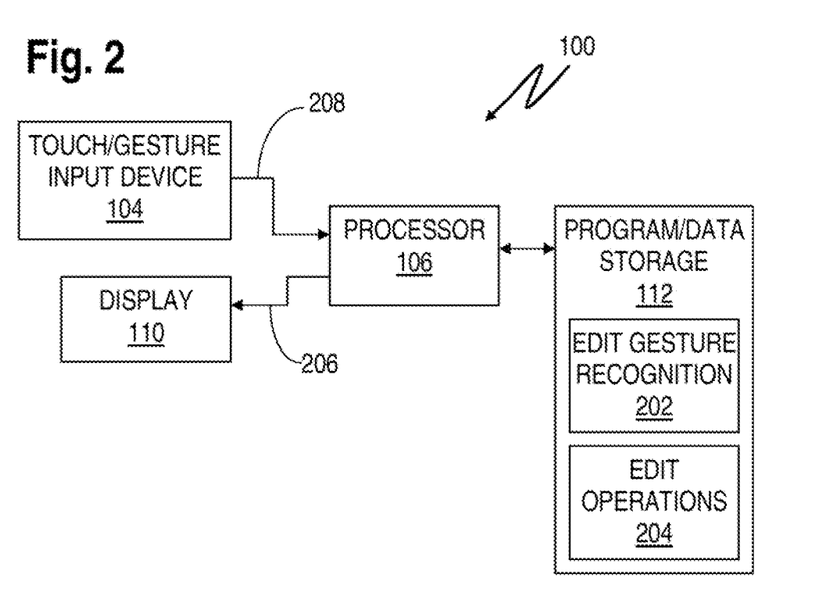
FIG. 2 shows a block diagram of a system including a gesture based edit mode applicable to a variety of applications in accordance with various embodiments.

FIG. 2 shows a block diagram of the system 100 including a gesture based edit mode applicable to a variety of applications in accordance with various embodiments. As explained above, the display 110 provides visual output to the system user. The display 110 is coupled to the processor 106 which provides video data 206 that is presented to the user in visual form on display 110. Video data 206 can include textual data, graphical data, etc.

The touch/gesture input device 104 detects user contacts and/or gestures and provides electrical signals 208 representative of the contacts and/or gestures to the processor 106. The signals 208 represent contact/gestures identifying operations that the user wishes to perform. In embodiments of the present disclosure, signals 208 are representative of gestures indicating that the user wishes to initiate an edit mode and/or perform an editing operation on a document presented on display 110.

Processor 106 executes software programming stored in program/data storage 112. Programming stored in storage 112 includes edit gesture recognition program 202 and edit operations program 204. The gesture recognition program 202 processes the signals 208 to determine the contact or gesture represented. Embodiments of the gesture recognition program cause the processor 106 to identify gestures indicative of a user's desire to enter an editing mode, or a desire to perform a cut, paste, copy, undo, and/or selection operation using the document presented on the display 110. When a particular gesture has been identified as an editing gesture, editing operations software 204 causes the processor to perform the indicated operation on the document presented on the display 110. Thus, the editing operation 204 can cause modification of the document in storage 112 and corresponding modification of the document presented on display 110.

Some embodiments of the system 100 include edit gesture recognition 202, and editing operations 204 that perform the operations described below with regard to the flow diagram of FIG. 3. Some embodiments of system 100 include edit gesture recognition 202 that identifies as edit gestures the gestures described below with regard to FIGS. 4-8.

Figure 3:
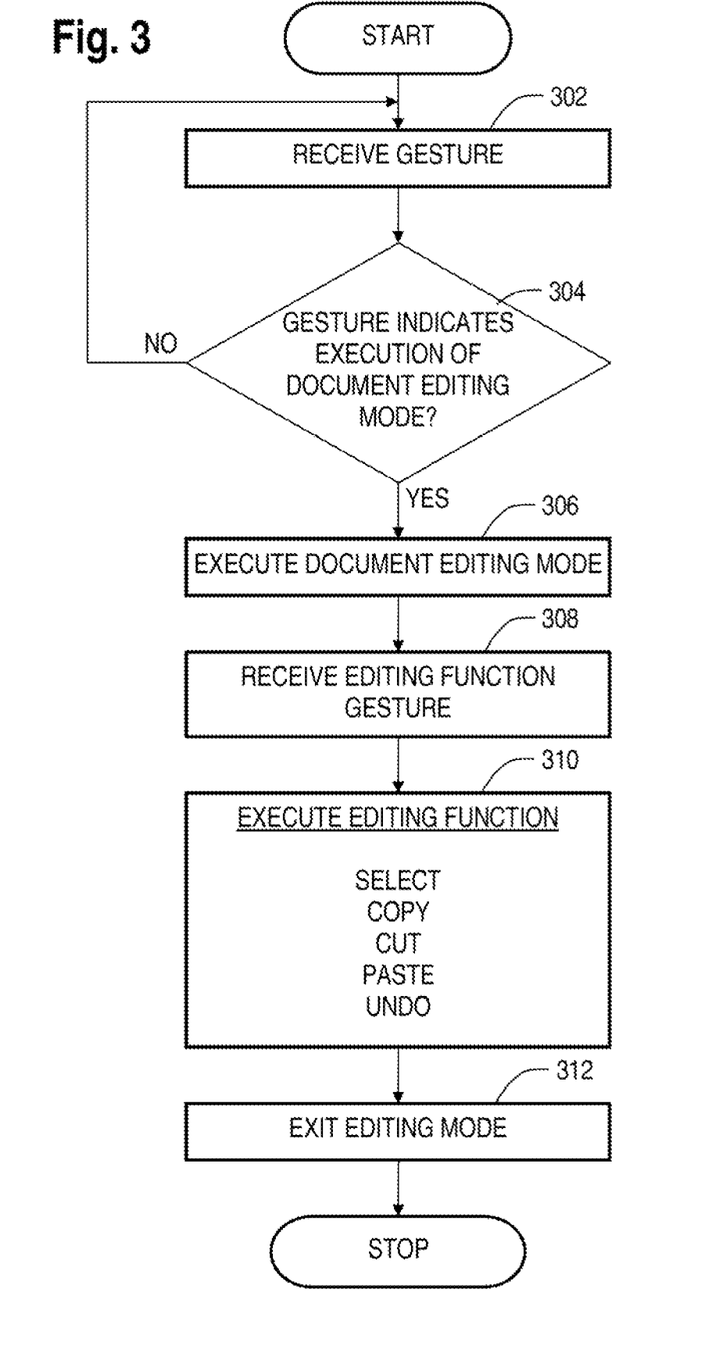
FIG. 3 shows a flow diagram for a method for implementing a gesture based edit mode applicable to a variety of applications in accordance with various embodiments.

FIG. 3 shows a flow diagram for a method for implementing a gesture based edit mode applicable to a variety of applications in accordance with various embodiments. Though depicted sequentially as a matter of convenience, at least some of the actions shown can be performed in a different order and/or performed in parallel. Additionally, some embodiments may perform only some of the actions shown.

In block 302, the touch/gesture input device 104 detects user contact or a gesture. The contact or gesture is converted to electrical signals 208, and the electrical signals are provided to the processor 106. The processor 106 executes instructions of edit gesture recognition program 202 to determine whether the signals 208 represent a gesture indicating that the user desires to execute a document editing mode. In some embodiments, the user can tap the input device 104 with two fingers simultaneously (i.e., make contact with the input device at two points within a predetermined proximity of one another) to indicate a desire to enter editing mode. However, embodiments are not limited to any particular chord or gesture to indicate selection of document editing mode.

If, in block 304, the processor 106 executing the gesture recognition program 202 determines that the edit mode selection gesture has been executed, document editing mode is initiated in block 306, otherwise, gesture processing continues in block 302.

In at least some embodiments, the system 100 is in document editing mode in block 308 and the processor 106 is receiving and processing signals 208 to identify a gesture signifying the edit function the user desires to perform. Embodiments of the present disclosure include recognition of gestures corresponding to the cut, paste, copy, undo, and/or select operations. After initiating edit mode, the user performs a gesture corresponding to one of these operations, and the processor 106 executes edit operations software 204, in block 310, to perform the requested editing operation. In some embodiments, the edit operation gestures recognized by the gesture recognition program 202 executing on the processor 106 correspond to the cut, paste, copy, undo, and/or select gestures described in FIGS. 4-8.

The cut, paste, copy, select, and undo operations are well known in the art. Generally, the select operation allows the user, for example, to choose a text string or object on which a subsequent editing operation will be performed. The cut operation can, for example, remove a selected text string or object from a document. The copy operation can, for example, duplicate a selected text string or object for later inclusion in a document. The paste operation can, for example, insert a previously stored copy of a text string or object into a document. The undo operation can, for example, reverse the effects of previously performed editing operation.

In block 312, the editing mode is exited. In at least some embodiments, the editing mode is exited after any single editing operation is performed. Thus, in some embodiments, the system enters editing mode in block 306, performs a single selected editing operation in block 310, and exits editing mode in block 312.

Some embodiments do not require recognition of a designated gesture, for example, tapping with two fingers simultaneously, to enter edit mode, rather these embodiments enter edit mode on recognition of an edit function gesture (i.e., a select gesture, a copy gesture, a cut gesture, a paste gesture, or an undo gesture).

Figure 4:
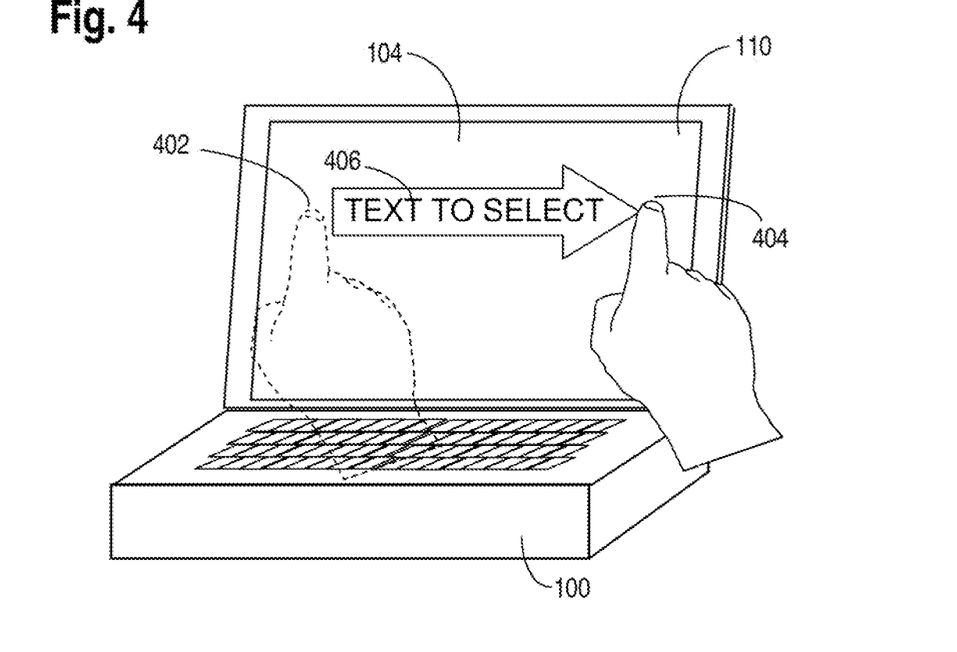
FIG. 4 shows an exemplary select gesture used in a system including a gesture based edit mode in accordance with various embodiments.

FIG. 4 shows an exemplary select gesture that can be used in various embodiments of the system 100 In FIG. 4, the user desires to select the displayed text 406. To select the text 406, the user preferably contacts the input device 104 at point 402 and maintains contact at point 402 for a predetermined time interval (e.g., 1-1.5 seconds). The input device 104 detects the contact and provides signals 208 representing the contact to the processor 106. Based on the signals 208, the processor 106 executing edit gesture recognition program 202 determines that the user desires to select a currently displayed text string or object. The user maintains contact with the input device 104, and swipes his finger across the text 406 to select the text 406. Selection is complete when the user discontinues contact with the input device 104. The input device provides signals 208 to the processor 106 that represent the movement of the user's point of contact on the input device 104 over the text 406, and the user's cessation of contact with the input device 104. The processor 106 processes the signals 208 to determine the text or object selected. In some embodiments, the processor and associated software may provide feedback to the user by, for example, highlighting the selected text 406 on the display 110.

Figure 5:
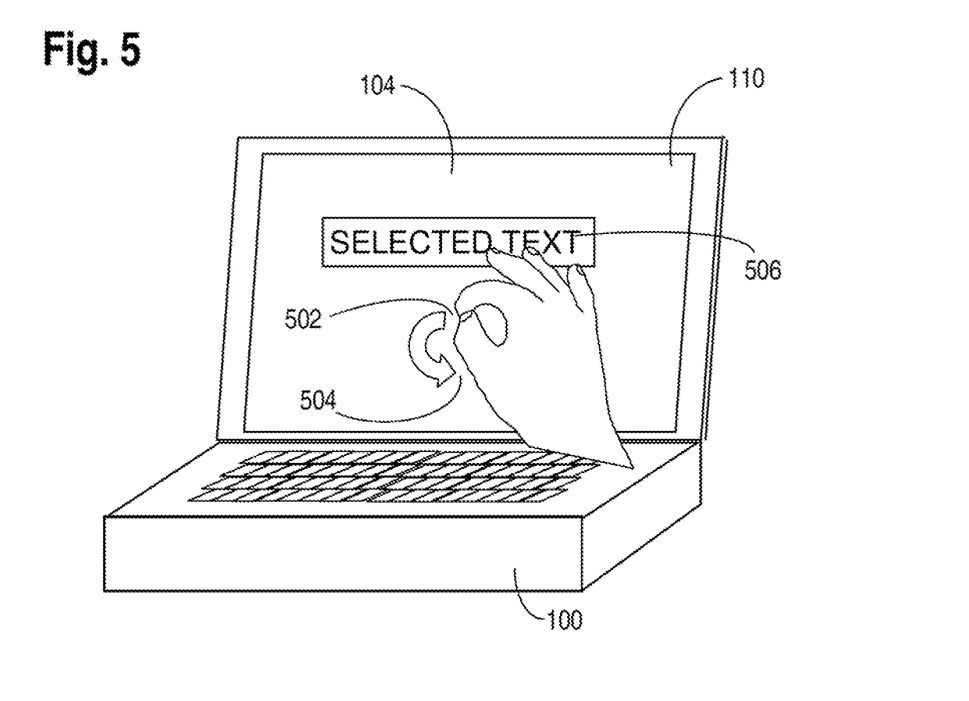
FIG. 5 shows an exemplary copy gesture used in a system including a gesture based edit mode in accordance with various embodiments.

FIG. 5 shows an exemplary copy gesture used in various embodiments of the system 100. In some embodiments, the user has executed a previous gesture, for example, tapped the input device 104 with two fingers, to enter edit mode prior to executing the copy gesture. In FIG. 5, the user desires to make a copy of the previously selected text 506. To copy the text 506, the user preferably contacts the input device 104 with two fingers at point 502 (which may be any point on the input device 104). The two fingers may be, for example, the user's thumb and index finger. The two fingers are preferably within a predetermined proximity to one another, for example, in contact or less that on centimeter apart. While maintaining contact with the input device 104 with both fingers, a first finger (e.g., the thumb) is moved in a semicircular arc to a position 504 on the input device 104 below the other finger. The input device 104 detects the contact of the fingers and the movement of the first finger and provides signals 208 representing the contact and movement to the processor 106. Based on the signals 208, the processor 106 executing edit gesture recognition program 202 determines that the user desires to copy a preselected object or string of text. In some embodiments, the processor and associated software (e.g., edit operations program 204) stores a copy of the selected text in storage 112.

Figure 6:
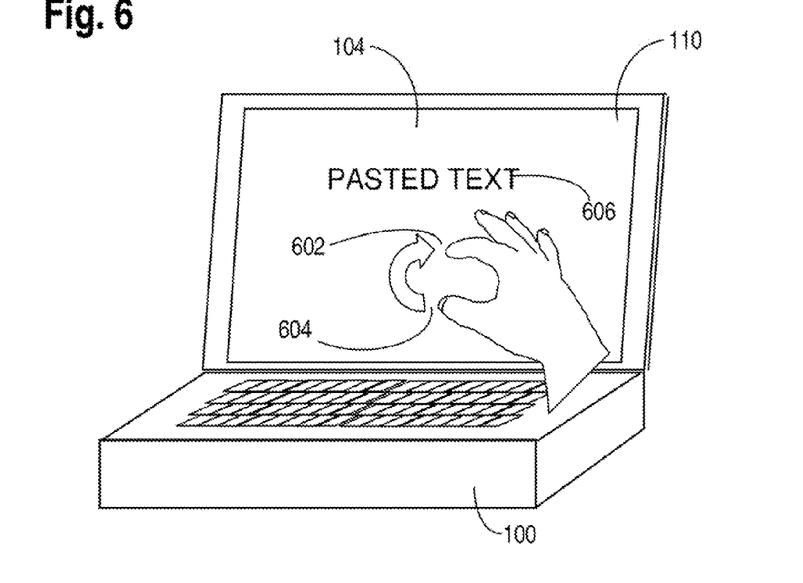
FIG. 6 shows an exemplary paste gesture used in a system including a gesture based edit mode in accordance with various embodiments.

FIG. 6 shows an exemplary paste gesture used in various embodiments of the system 100. In some embodiments, the user has executed a previous gesture, for example, tapped the input device 104 with two fingers, to enter edit mode prior to executing the paste gesture. In FIG. 6, the user desires to paste (i.e., insert) a previously copied text string 606 into the document currently presented on display 110. To paste the text 606, the user preferably contacts the input device 104 with two fingers at point 604. The two fingers may be, for example, the user's thumb and index finger. The two fingers are preferably within a predetermined proximity to one another, for example, in contact or less that on centimeter apart. While maintaining contact with the input device 104 with both fingers, a first finger (e.g., the index finger) is moved in a semicircular arc to a position 602 on the input device 104 above the other finger. The input device 104 detects the contact of the fingers and the movement of the first finger and provides signals 208 representing the contact and movement to the processor 106. Based on the signals 208, the processor 106 executing edit gesture recognition program 202 determines that the user desires to paste a previously stored object or string of text into the document currently presented on display 110. In some embodiments, the processor and associated software (e.g., edit operations program 204) cause the text to be inserted into the currently displayed document at point 602, other embodiments cause the text to be inserted the point 604, or another point.

Figure 7:
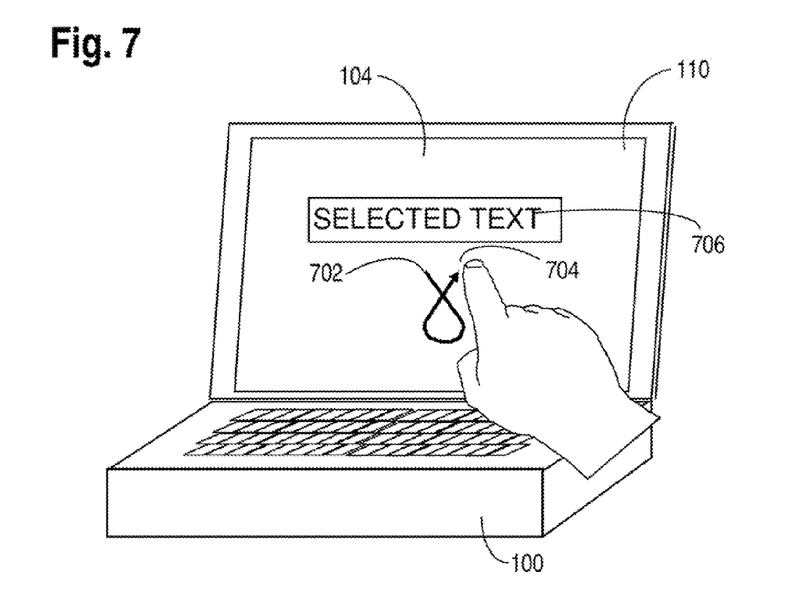
FIG. 7 shows an exemplary cut gesture used in a system including a gesture based edit mode in accordance with various embodiments.

FIG. 7 shows an exemplary cut gesture used in various embodiments of the system 100. In some embodiments, the user has executed a previous gesture, for example, tapped the input device 104 with two fingers, to enter edit mode prior to executing the paste gesture. In FIG. 7, the user desires to cut (i.e., remove) a previously selected text string 706 from the document currently presented on display 110. To cut the text 706, the user preferably contacts the input device 104 with one finger at point 702 (point 702 can be any point on the input device 104). While maintaining contact with the input device 104 the finger moves in a clockwise loop to point 704, forming an X with teardrop shaped bottom (𝒳). The input device 104 detects the contact and the movement of the finger and provides signals 208 representing the contact and movement to the processor 106. Based on the signals 208, the processor 106 executing edit gesture recognition program 202 determines that the user desires to cut the preselected text 706. In some embodiments, the processor, and associated software (e.g., edit operations program 204), stores a copy of the removed text in storage 112.

Figure 8:
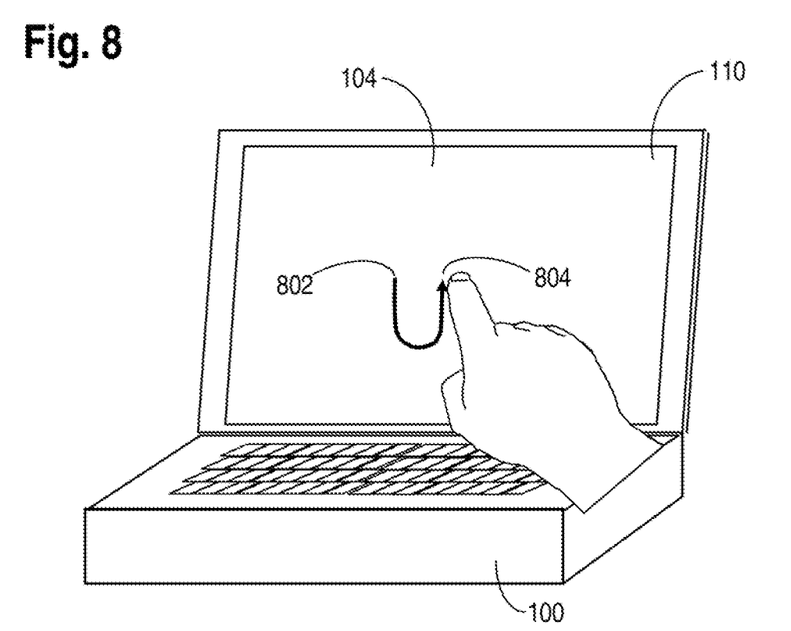
FIG. 8 shows an exemplary undo gesture used in a system including a gesture based edit mode in accordance with various embodiments.

FIG. 8 shows an exemplary undo gesture used in various embodiments of the system 100. In some embodiments the user has executed a previous gesture, for example, tapped the input device 104 with two fingers, to enter edit mode prior to executing the paste gesture. In FIG. 8, the user desires to undo (i.e., reverse) the effects of a previously performed editing operation on the document currently presented on display 110 (e.g., restore previously deleted text). To undo a previous operation, the user preferably contacts the input device 104 with one finger at point 802 (point 802 can be any point on the input device 104). While maintaining contact with the input device 104 the finger moves to point 804 form the letter 'U' .The input device 104 detects the contact and the movement of the finger and provides signals 208 representing the contact and movement to the processor 106. Based on the signals 208, the processor 106 executing edit gesture recognition program 202 determines that the user desires to undo a previous edit operation, and edit operations program 204 is invoked to perform the undo operation.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
an operator input device that detects gestures and multiple simultaneous touch points;

a processor coupled to the operator input device, the processor executes a gesture recognition software program that processes inputs from the operator input device;

wherein the gesture recognition program recognizes a predetermined edit mode gesture and, based on the predetermined edit mode gesture, the processor executes an edit mode software program that:

provides a plurality of document editing functions for modifying a currently displayed document; and discontinues execution of the edit mode software program when execution any one of the plurality of document editing functions is complete.

2. The system of claim 1, wherein the edit mode program when executed by the processor provides a cut function, a paste function, a copy function, and an undo function.

3. The system of claim 1, wherein the gesture recognition program when executed by the processor causes the processor to execute the edit mode software program when the gesture recognition program causes the processor to detect two user contact points within a predetermined proximity to one another.

4. The system of claim 1, wherein the edit mode program causes the processor to execute a copy function when the gesture recognition program causes the processor to detect two user contact points on the input device within a predetermined proximity to one other and one of the user contact points subsequently moves in semi-circular arc to a lower position on the input device while the other user contact point is stationary.

5. The system of claim 1, wherein the edit mode program causes the processor to execute a paste function when the gesture recognition program causes the processor to detect two user contact points on the input device within a predetermined proximity to one other and one of the user contact points subsequently moves in semi-circular arc to higher position on the input device while the other user contact point is stationary.

6. The system of claim 1, wherein the edit mode program causes the processor to execute a cut function when the gesture recognition program causes the processor to detect a user contact point on the input device and the point subsequently moves in clockwise loop forming a teardrop bottomed letter 'X'(ᛪ).

7. The system of claim 1, wherein the edit mode program causes the processor to execute an undo function when the gesture recognition program causes the processor to detect a user contact point on the input device and the point subsequently moves counterclockwise to form an uppercase letter 'U'.

8. A method, comprising:

receiving a first signal from a gesture input device indicating that a document editing mode program is to be executed;

executing the document editing mode program, the document editing mode program allows a single selected editing operation of a plurality of available editing operations to be performed on a document;

receiving a second signal from the gesture input device selecting the single editing operation to be performed;

executing the single selected document editing operation;

exiting the document editing mode program on completion of the single selected document editing operation.

9. The method of claim 8, further comprising selecting the single document editing operation from a group consisting of a cut operation, a paste operation, a copy operation, and an undo operation.

10. The method of claim 9, further comprising determining that the second signal indicates a gesture selected from a group consisting of a cut gesture formed by depressing a point on the gesture input device and subsequently moving the point in a clockwise loop forming a teardrop bottomed letter 'X' ( ᛪ );

a paste gesture formed by depressing two points on the gesture input device within a predetermined proximity to one other and subsequently moving one of the points in a clockwise semicircular arc to a higher position on the gesture input device while the other point remains stationary;

a copy gesture formed by depressing two points on the gesture input device within a predetermined proximity to one other and subsequently moving one of the points in a counterclockwise semicircular arc to a lower position on the gesture input device while the other point remains stationary; and an undo gesture formed by depressing a point on the gesture input device and subsequently moving the point counterclockwise to form a uppercase letter 'U'.

11. A non-transitory computer readable medium encoded with a computer program comprising instructions that cause a processor to perform the operations of claim 9.

12. The computer readable medium of claim 11, further comprising instructions that cause the processor to perform the operations of claim 10.

13. A non-transitory computer readable medium encoded with a computer program, comprising:

instructions that when executed cause a processor to perform an edit function selected from a group of edit functions comprising a copy function, a cut function, a paste function, and an undo function; and instructions that when executed cause the processor to identify a gesture corresponding to a request to perform an editing function;

wherein the instructions that when executed cause the processor to identify an edit gesture cause the processor to identify a copy gesture formed by depressing two points on a gesture input device within a predetermined proximity to one other and subsequently moving one of the points in a counterclockwise semicircular arc to a lower position on the gesture input device while the other point remains stationary.

14. The computer readable medium of claim 13, wherein the instructions that when executed cause the processor to identify a gesture cause the processor to identify an edit function gesture selected from a group of edit function gestures consisting of:

a cut gesture formed by depressing a point on the gesture input device and subsequently moving the point in a clockwise loop forming a teardrop bottomed letter 'X' (ᛪ);

a paste gesture formed by depressing two points on the gesture input device within a predetermined proximity to one other and subsequently moving one of the points in a clockwise semicircular arc to a higher position on the gesture input device while the other point remains stationary; and an undo gesture formed by depressing a point on the gesture input device and subsequently moving the point counterclockwise to form a uppercase letter 'U'.

* * * * *

UNITED STATES PATENT AND TRADEMARK OFFICE
CERTIFICATE OF CORRECTION

| | | |
|---|---|---|
| PATENT NO. | : 8,707,170 B2 | Page 1 of 1 |
| APPLICATION NO. | : 13/139748 | |
| DATED | : April 22, 2014 | |
| INVENTOR(S) | : Christopher M. Rives et al. | |

It is certified that error appears in the above-identified patent and that said Letters Patent is hereby corrected as shown below:

In the Claims:

In column 7, line 10, in Claim 1, after "execution" insert -- of --.

Signed and Sealed this
Twelfth Day of August, 2014

Michelle K. Lee
*Deputy Director of the United States Patent and Trademark Office*